US008983382B2

(12) United States Patent
Smely et al.

(10) Patent No.: US 8,983,382 B2
(45) Date of Patent: Mar. 17, 2015

(54) RADIO BEACON AND METHOD FOR SELECTIVELY COMMUNICATING IN ACCORDANCE WITH 5.8 AND 5.9 GHZ DSRC STANDARDS

(75) Inventors: Dieter Smely, Schwechat (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 314 days.

(21) Appl. No.: 13/598,081

(22) Filed: Aug. 29, 2012

(65) Prior Publication Data

US 2013/0072121 A1 Mar. 21, 2013

(30) Foreign Application Priority Data

Sep. 21, 2011 (EP) .................................... 11450123

(51) Int. Cl.
*H04B 7/00* (2006.01)
*H04W 16/14* (2009.01)
*G07B 15/06* (2011.01)

(52) U.S. Cl.
CPC ............. *H04W 16/14* (2013.01); *G07B 15/063* (2013.01)
USPC ........................... 455/41.2; 370/338; 370/235

(58) Field of Classification Search
CPC ........... G07B 15/063; G08G 1/096716; G08G 1/096791; H04W 72/0413; H04W 72/042; H04W 72/0446; H04W 74/04; H04W 12/06; H04W 24/00; H04W 48/02; H04W 4/046
USPC .......... 455/41.1–41.3, 427, 62; 370/338, 315, 370/445, 503, 468, 328, 235, 310
See application file for complete search history.

(56) References Cited

U.S. PATENT DOCUMENTS

| | | | | |
|---|---|---|---|---|
| 2004/0160930 | A1* | 8/2004 | Choi et al. | 370/338 |
| 2004/0223467 | A1 | 11/2004 | Hundal et al. | |
| 2005/0197680 | A1 | 9/2005 | DelMain et al. | |
| 2005/0233789 | A1* | 10/2005 | Maekawa | 463/1 |
| 2006/0165024 | A1* | 7/2006 | Iwami et al. | 370/315 |
| 2006/0189309 | A1 | 8/2006 | Good et al. | |
| 2007/0063872 | A1 | 3/2007 | Ho et al. | |
| 2007/0171887 | A1 | 7/2007 | Waxman | |
| 2009/0168650 | A1* | 7/2009 | Kesselman | 370/235 |
| 2010/0150077 | A1* | 6/2010 | Nanda et al. | 370/328 |
| 2010/0296495 | A1* | 11/2010 | Iino et al. | 370/338 |
| 2011/0164594 | A1* | 7/2011 | Stahlin et al. | 370/338 |

OTHER PUBLICATIONS

Extended European Search Report for Corresponding European Patent Application No. 11 450 123.2, dated Jan. 27, 2012, 7pp.

* cited by examiner

*Primary Examiner* — Golam Sorowar
(74) *Attorney, Agent, or Firm* — Fiala & Weaver P.L.L.C.

(57) ABSTRACT

A radio beacon and a method for selective radio communication with a first onboard unit and a second onboard unit, in which a sequence of first data packet is transmitted to the first onboard unit in a first frequency band in accordance with 5.8 GHz DSRC standards, a sequence of second data packet is transmitted or received to/from the second onboard unit in accordance with 5.9 GHz DSRC standards, wherein the transmission of a data packet of the sequence of first data packet is delayed by the duration of the second data packet if the second data packet appears in the second frequency band.

10 Claims, 2 Drawing Sheets

RADIO BEACON AND METHOD FOR SELECTIVELY COMMUNICATING IN ACCORDANCE WITH 5.8 AND 5.9 GHZ DSRC STANDARDS

CROSS-REFERENCE TO RELATED APPLICATION(S)

This application claims priority to European Patent Application No. 11 450 123.2, filed on Sep. 21, 2011, the entire contents of which are hereby expressly incorporated by reference.

FIELD OF THE INVENTION

The present invention pertains to a radio beacon with at least one first transceiver for radio communication with first onboard units in accordance with 5.8 GHz DSRC standards and with at least one second transceiver for radio communication with second onboard units in accordance with 5.9 GHz DSRC standards. The invention further pertains to a method for selective communication between such a radio beacon and first and second onboard units.

BACKGROUND

Radio beacons that operate in accordance with 5.8 GHz DSRC standards are ordinarily used in toll road systems to determine and consequently charge tolls for the utilization of certain facilities by vehicles equipped with onboard units ("OBUs"), based on short-range radio communication with the onboard units. This results in the broad utilization of onboard units and radio beacons according to 5.8 GHz DSRC standards such as, e.g., standards CEN EN 12253, ETSI EN 300 674, ETSI ES 200 674-1 and ETSI ES 200 674-2. However, toll road and communication systems according to 5.9 GHz DSRC standards such as, standards IEEE 802.11p ("WAVE"), ETSI ES 202 663, ETSI EN 302 571 and ETSI EN 302 665 ("ITS-G5") nowadays are also increasingly utilized.

"Hybrid radio beacons" should be able to communicate with vehicles equipped with 5.8 GHz DSRC OBUs, as well as with vehicles equipped with 5.9 GHz DSRC OBUs. However, it is known that mutual interferences between the transceivers and their respective radio communications with the OBUs can occur despite the different frequency bands due to the close vicinity of the corresponding transceivers in the radio beacon and their partially overlapping radio coverage areas. ETSI TR 102 654 describes these possible interferences between the two radio systems.

SUMMARY

The present invention aims to eliminate this problem and to develop a solution for the communication of 5.8 and 5.9 GHz DSRC OBUs with a hybrid radio beacon that is highly insusceptible to interferences.

In some embodiments, the invention is a radio beacon including a first transceiver for radio communication with a first onboard unit in accordance with a 5.8 GHz DSRC standard, wherein the first transceiver is configured to transmit a sequence of first data packets in a first frequency band; and a second transceiver for radio communication with a second onboard unit in accordance with a 5.9 GHz DSRC standard, wherein the second transceiver is configured to transmit or receive a second data packet in a second frequency band, wherein the radio beacon is configured to delay transmission of a data packet of the sequence of first data packets by a time duration of the second data packet, when the second data packet appears in the second frequency band.

According to some embodiments of the invention, the first transceiver monitors the second frequency band to cause the delay in the transmission of a first data packet, when it detects a second data packet in the second frequency band. In this way, a "listen-before-talk" function is implemented for the 5.8 GHz DSRC transceiver, i.e., this transceiver likewise "listens into" a "foreign" frequency band, namely the 5.9 GHz band, before it transmits in the 5.8 GHz DSRC band in accordance with its own standard. Alternatively, the second transceiver may directly control the first transceiver in order to cause the aforementioned delay in the transmission of the first data packet, when it transmits or receives a second data packet.

According to some embodiments of the invention, the second transceiver may monitor the first frequency band and only transmit a second data packet, when the first frequency band is clear. This provides the 5.9 GHz DSRC transceiver with a modified "listen-before-talk" function, according to which this transceiver also "listens into" the "foreign" 5.8 GHz DSRC band before it transmits in the frequency band in accordance with its own standard. Alternatively, the first transceiver may directly prevent the second transceiver from transmitting a second data packet, when it transmits or receives a first data packet.

According to some embodiments, the invention is a method for selective radio communication between a radio beacon and first and second onboard units. The method includes: transmitting, by the radio beacon to the first onboard unit, a sequence of first data packets in a first frequency band, in accordance with a 5.8 GHz DSRC standard; and transmitting or receiving, by the radio beacon to/from the second onboard unit, at least one second data packet in a second frequency band, in accordance with a 5.9 GHz DSRC standard, wherein transmission of a data packet of the sequence of first data packets is delayed by a duration of the second data packet, when the second data packet appears in the second frequency band.

BRIEF DESCRIPTION OF THE DRAWINGS

The invention is described in greater detail below with reference to an exemplary embodiment that is illustrated in the attached drawings. In these drawings.

DETAILED DESCRIPTION

According to 5.8 GHz DSRC standards, a beacon usually transmits a regular sequence of Beacon Service Table (BST) Messages as "first data packets" to prompt passing OBUs to reply. The time period between two data packets of the sequence cannot be so long that an OBU passing very quickly through the radio coverage area of the 5.8 GHz DSRC transceiver could possibly not receive a BST data packet and therefore fail to establish communication with the beacon. At a conventional 5.8 GHz DSRC radio coverage range of the beacon of 5-10 m and a maximum driving speed of about 200 km/h, the time intervals in the sequence of first data packets are defined, e.g., at 10-30 ms. The present invention is based on the notion that data packets according to 5.9 GHz DSRC standards respectively have only a short duration, e.g., of no more than 2 ms such that the 5.8 GHz DSRC data packets to be periodically repeated can be delayed by this duration in order to avoid collisions. In this way, the sequence of 5.8 GHz DSRC data packets is slightly varied in time similar to a "phase jitter," wherein this does not impair the 5.8 GHz DSRC functionality, but effectively prevents interferences or crosstalk between the 5.8 and 5.9 GHz DSRC communication standards.

Figure 1:
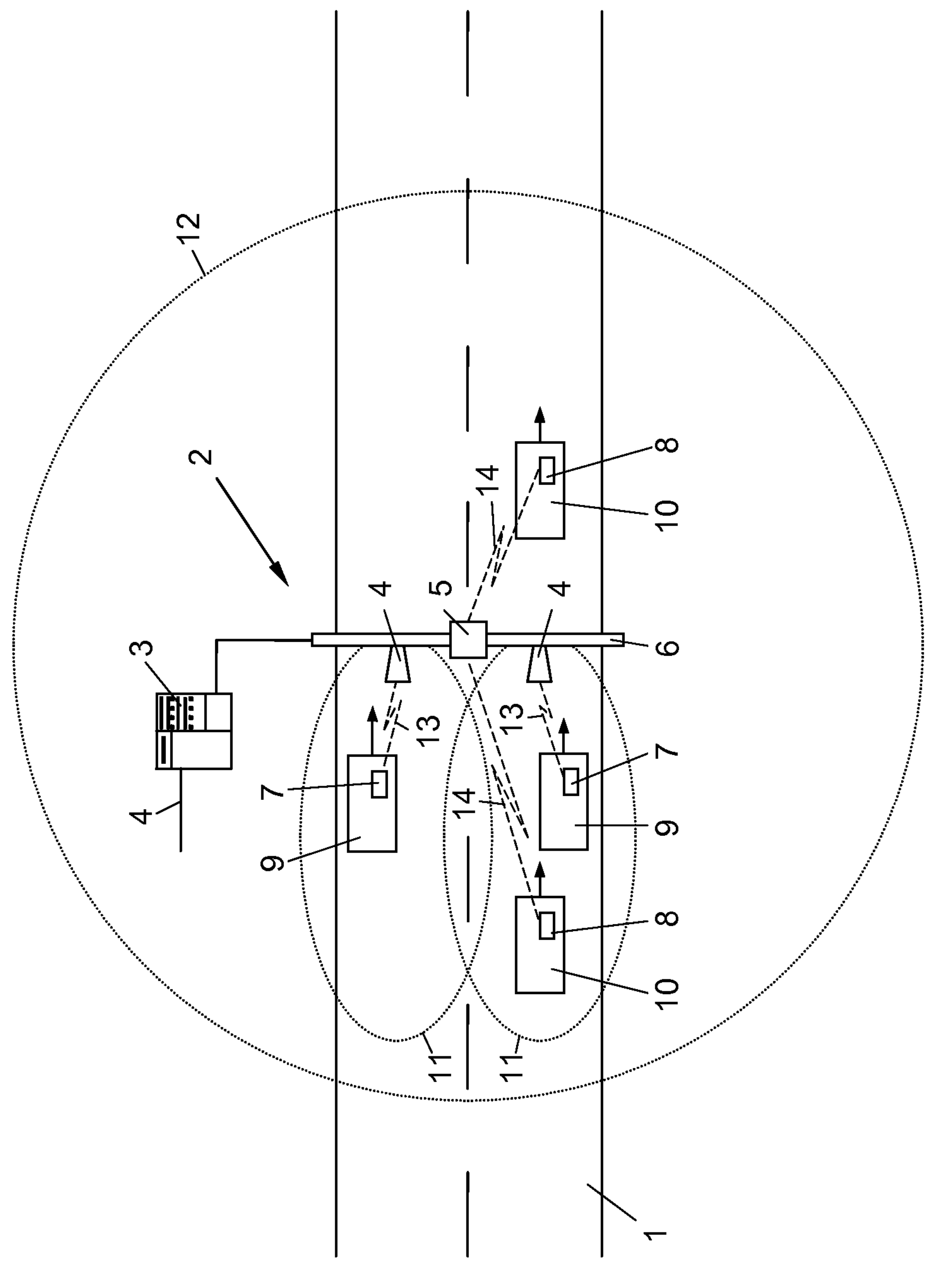
FIG. 1 shows a schematic representation of a radio beacon according to the invention.

FIG. 1 shows a section of a road 1, on which a radio beacon 2 of toll road system and/or a road communication system (not-shown) is arranged. The radio beacon 2 is also referred to as a Roadside Unit (RSU) and comprises a local beacon computer 3 that is connected to a central office of the toll road or communication system (not-shown) via a data line 4, as well as several transceivers 4, 5 that are installed, for example, on a mounting bridge 6 that spans the road 1.

The radio beacon 2 is a "hybrid beacon" and can communicate via radio with two different types of onboard units or OBUs 7, 8 that are carried along by vehicles 9, 10 traveling on the road 1. 5.8 GHz DSRC OBUs 7 according to 5.8 GHz DSRC standards that cooperate with one dedicated 5.8 GHz DSRC transceivers 4 of the radio beacon 2 are the first type of OBUs. 5.9 GHz DSRC OBUs 8 according to 5.9 GHz DSRC standards that cooperate with at least one dedicated 5.9 GHz DSRC transceiver 5 of the radio beacon 2 are the second type of OBUs.

In the context of the present description, the designation "5.8 GHz DSRC standards" includes all dedicated short range communication (DSRC) standards that operate in the 5.8 GHz band, namely "High Data Rate" (HDR), "Medium Data Rate" (MDR) and "Low Data Rate" (LDR) variations of these standards including CEN EN 12253, ETSI EN 300 674, ETSI ES 200 674-1 and ETSI ES 200 674-2, and the designation "5.9 GHz DSRC standards" includes all DSRC standards that operate in the 5.9 GHz band including IEEE 802.11p ("WAVE"), ETSI ES 202 663, ETSI EN 302 571 and ETSI EN 302 665 ("ITS-G5").

Each of the 5.8 GHz DSRC transceivers 4 of the radio beacon 2 may optionally include an antenna with directional antenna characteristic (directional characteristic) that is tightly restricted, e.g., to a radio coverage area 11 limited to one lane of the road 1. 5.9 GHz DSRC transceivers 5, in contrast, preferably (although not necessarily) have an antenna with omnidirectional characteristic and a larger radio coverage area 12. Radio communications 13 between transceivers 4 and OBUs 7 take place in the 5.8 GHz band ("first frequency band") in accordance with 5.8 GHz DSRC standards while radio communications 14 between transceivers 5 and OBUs 8 take place in the 5.9 GHz band ("second frequency band"), in accordance with 5.9 GHz DSRC standards.

Due to the close vicinity of the transceivers 4, 5 and their partially overlapping radio coverage areas 11, 12, mutual interferences or data packet collisions between the 5.8 GHz systems and the 5.9 GHz systems of the radio beacon 2 may occur despite the different frequency bands of the radio communications 13, 14, wherein these interferences or data packet collisions are prevented as described below.

Figure 2:
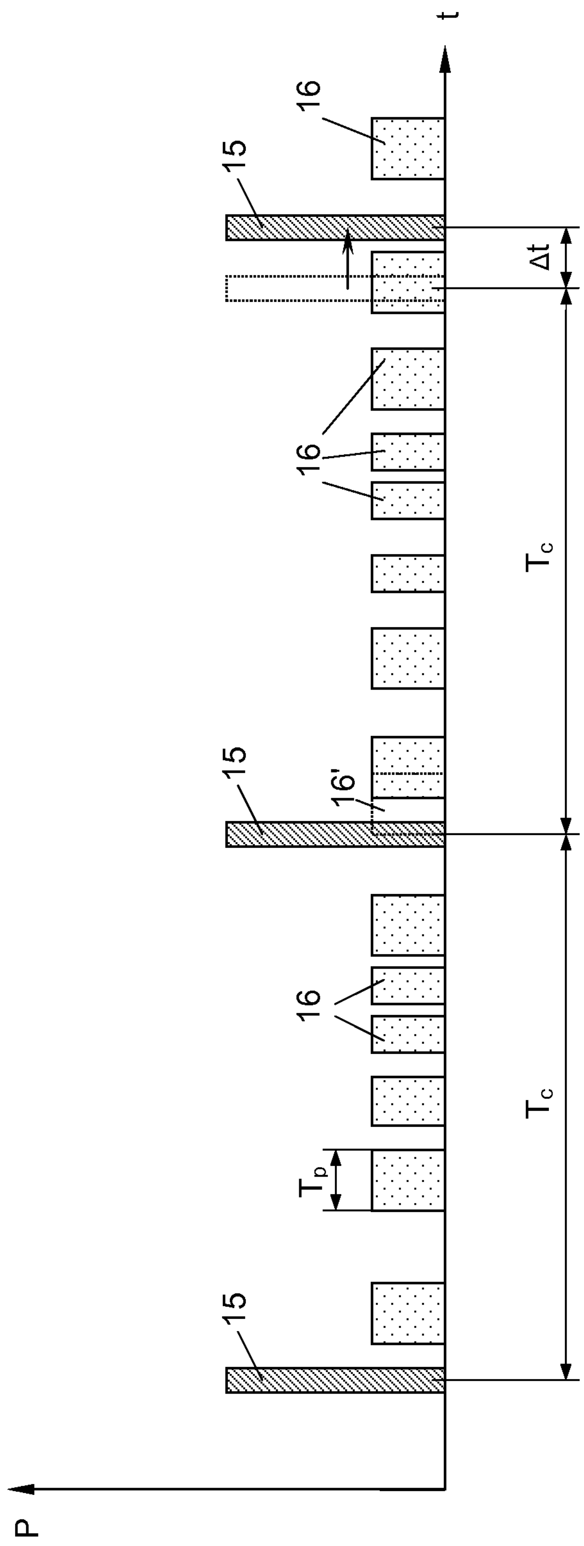
FIG. 2 shows a time-dependency diagram of the data packet transmissions of the radio beacon according to FIG. 1.

FIG. 2 shows a sequence of data packets 15, 16 that are respectively illustrated in the form of the average signal power P as a function of the time t. 5.8 GHz DSRC data packets 15 of the radio communication 13 are illustrated in a hatched fashion while 5.9 GHz DSRC data packets 16 of the radio communication 14 are illustrated in a dotted fashion.

According to 5.8 GHz DSRC standards, at least one 5.8 GHz DSRC data packet 15 is transmitted by the radio beacon 2 within a cycle time $T_c$. This usually includes a BST message that informs an OBU 7 passing through the radio coverage area 11 of the fact that a radio beacon 2 is positioned at this location. 5.8 GHz DSRC OBUs 7 respond to this with corresponding data packets (not-shown) such that radio communications 13 are established. The cycle time or the time interval $T_c$ is chosen in accordance with the size of the radio coverage area 11 and the maximum expected speed of the vehicles 9 such that each passing OBU 7 can receive at least one data packet 15. For a radio coverage area 11 of about 5-10 m and a maximum speed of the vehicles 9 of 200 km/h, the time interval $T_c$ amounts to 10-30 ms, particularly to about 20 ms.

Although WAVE Service Announcements (WSA messages) that correspond to the 5.8 GHz BST messages exist in 5.9 GHz DSRC standards, 5.9 GHz DSRC data packets 16 are, in contrast to 5.8 GHz DSRC data packets 15, not bound to a maximum time interval $T_c$, but rather may be transmitted by the transceivers 5 or OBUs 8 at any time. However, 5.9 GHz DSRC data packets 16 are always brief and have a maximum duration $T_p$, e.g., of 2 ms.

To prevent interferences between 5.8 GHz DSRC data packets 15 and 5.9 GHz data packets 16, the transmission of a 5.8 GHz DSRC data packet 15 is always delayed if it would coincide with a 5.9 GHz DSRC data packet 16. The delay may be implemented by a time delay $\Delta t$ that corresponds to the maximum duration $T_p$ of a 5.9 GHz DSRC data packet 16. The data packet 15 illustrated on the right side in FIG. 2 consequently is transmitted at a time $T_c+\Delta t$ after the preceding data packet 15. The following (no longer shown) data packet 15 may once again follow at the regular time interval $T_c$ or a reduced time interval $T_c-\Delta t$ in order to maintain an average time interval $T_c$.

On the other hand, the transmission of a 5.9 GHz DSRC data packet 16 can be suppressed if it would coincide with a 5.8 GHz DSRC data packet 15; see the "suppressed" data packet 16' illustrated in a dotted fashion in FIG. 2.

To achieve the aforementioned delay of the data packets 15, the 5.8 GHz DSRC transceiver 4 can either monitor the 5.9 GHz frequency band for the appearance of a 5.9 GHz DSRC data packet 16 or the 5.9 GHz DSRC transceiver 5 directly controls the 5.8 GHz DSRC transceiver 4 so as to delay its data packets 15 if this transceiver itself transmits or receives a data packet 16.

The 5.9 GHz DSRC transceiver 5 can directly monitor the 5.8 GHz frequency band for the appearance of a 5.8 GHz DSRC data packet 15 and, if it detects such a data packet, suspend its data packet 16'. Alternatively, the 5.8 GHz DSRC transceiver 4 directly controls the 5.9 GHz DSRC transceiver 5 so as to suppress the data packet 16'.

Due to the limited duration $T_p$ of the 5.9 GHz DSRC data packets 16, it is ensured that any 5.8 GHz DSRC data packet 15 is delayed by no more than $\Delta t=T_p$. At the aforementioned exemplary values, the 5.8 GHz DSRC data packets 15 transmitted every $T_c=20$ ms therefore would individually be delayed by no more than 2 ms such that the 5.8 GHz DSRC functionality of the radio beacon 2 is not impaired.

It will be recognized by those skilled in the art that various modifications may be made to the illustrated and other embodiments of the invention described above, without departing from the broad inventive step thereof. It will be understood therefore that the invention is not limited to the particular embodiments or arrangements disclosed, but is rather intended to cover any changes, adaptations or modifications which are within the scope and spirit of the invention as defined by the appended claims.

The invention claimed is:

1. A radio beacon comprising:

a first transceiver for radio communication with a first onboard unit in accordance with a 5.8 GHz DSRC standard, wherein the first transceiver is configured to transmit a sequence of first data packets in a first frequency band; and a second transceiver for radio communication with a second onboard unit in accordance with a 5.9 GHz DSRC standard, wherein the second transceiver is configured to transmit or receive a second data packet in a second frequency band, the first frequency band and the second frequency band being different from each other, wherein the radio beacon is configured to delay transmission of a data packet of the sequence of first data packets by a time duration of the second data packet, when the second data packet appears in the second frequency band.

2. The radio beacon according to claim 1, wherein a time interval between two data packets of the sequence of first data packets is in a range of 10-30 ms and the time duration of the second data packet is equal to or less than 2 ms.

3. The radio beacon according to claim 1, wherein the first transceiver monitors the second frequency band to cause the delay in the transmission of a first data packet, when the second data packet in the second frequency band is detected.

4. The radio beacon according to claim 1, wherein the second transceiver controls the first transceiver to cause the delay in the transmission of a first data packet, when the second transceiver transmits or receives a second data packet.

5. The radio beacon according to claim 1, wherein the second transceiver monitors the first frequency band and transmits a second data packet, only when the first frequency band is clear.

6. The radio beacon according to claim 1, wherein the first transceiver prevents the second transceiver from transmitting a second data packet, when the first transceiver transmits or receives a first data packet.

7. The radio beacon according to claim 1, wherein the first transceiver comprises an antenna with directional characteristic.

8. A method for selective radio communication between a radio beacon and first and second onboard units, the method comprising:

transmitting, by the radio beacon to the first onboard unit, a sequence of first data packets in a first frequency band, in accordance with a 5.8 GHz DSRC standard; and transmitting or receiving, by the radio beacon to/from the second onboard unit, at least one second data packet in a second frequency band, in accordance with a 5.9 GHz DSRC standard, the first frequency band and the second frequency band being different from each other, wherein transmission of a data packet of the sequence of first data packets is delayed by a duration of the second data packet, when the second data packet appears in the second frequency band.

9. The method according to claim 8, wherein a time interval between two data packets of the sequence of first data packets is about 10-30 ms and the aforementioned duration of a second data packet is no longer than 2 ms.

10. The method according to claim 8, wherein a second data packet is transmitted, only when the first frequency band is clear.

* * * * *